US012654051B2

(12) United States Patent
Subramanian et al.

(10) Patent No.: US 12,654,051 B2
(45) Date of Patent: Jun. 16, 2026

(54) APPARATUSES AND METHODS FOR MEASURING FIRE SPREAD RATE

(71) Applicant: Honeywell Analytics Inc., Charlotte, NC (US)

(72) Inventors: Hariprasath Subramanian, Charlotte, NC (US); Renjith George, Charlotte, NC (US); Prashant Prabhu, Charlotte, NC (US); Kingslin Joseph, Charlotte, NC (US)

(73) Assignee: Honeywell Analytics Inc., Charlotte, NC (US)

( * ) Notice: Subject to any disclaimer, the term of this patent is extended or adjusted under 35 U.S.C. 154(b) by 247 days.

(21) Appl. No.: 18/521,325

(22) Filed: Nov. 28, 2023

(65) Prior Publication Data

US 2024/0238633 A1 Jul. 18, 2024

(30) Foreign Application Priority Data

Jan. 13, 2023 (IN) ............................. 202311002785

(51) Int. Cl.
*A62C 37/40* (2006.01)

(52) U.S. Cl.
CPC .................................... *A62C 37/40* (2013.01)

(58) Field of Classification Search
CPC ......... A62C 37/04; A62C 37/40; A62C 37/36; A62C 3/00; A62C 3/06; A62C 99/0009; A62C 99/009; G08B 17/125
USPC ......................................... 169/45-47, 56, 60
See application file for complete search history.

(56) References Cited

U.S. PATENT DOCUMENTS

| | | | | |
|---|---|---|---|---|
| 4,648,462 A * | 3/1987 | Odashima | G08B 17/12 | 169/61 |
| 5,937,077 A * | 8/1999 | Chan | G06V 20/40 | 382/203 |
| 8,655,010 B2 | 2/2014 | Finn et al. | | |
| 10,991,223 B2 | 4/2021 | Weiss et al. | | |
| 2010/0117839 A1* | 5/2010 | Lee | H04N 23/698 | 348/E5.093 |
| 2015/0021054 A1 | 1/2015 | Mcnamara et al. | | |

(Continued)

FOREIGN PATENT DOCUMENTS

| | | |
|---|---|---|
| CN | 101840571 B | 3/2012 |
| CN | 105528781 A | 4/2016 |
| CN | 114476893 A | 5/2022 |

(Continued)

OTHER PUBLICATIONS

Extended European Search Report Mailed on Apr. 8, 2024 for EP Application No. 23207434, 6 page(s).

*Primary Examiner* — Steven M Sutherland
(74) *Attorney, Agent, or Firm* — Alston & Bird LLP

(57) ABSTRACT

Methods, apparatuses and systems for measuring a fire spread rate by a controller component are provided. The method includes: monitoring a field of view of a first sensor, where the first sensor is a long wavelength infrared (LWIR) camera configured to detect one or more fire by products; determining that a fire event occurs based on a detection of at least one particle in the field of view of the first sensor; determining a fire spread rate in an instance that the fire event occurs; and triggering an extinguisher system according to the fire spread rate and a distance between the first sensor and the extinguisher system.

18 Claims, 5 Drawing Sheets

(56) References Cited

U.S. PATENT DOCUMENTS

| | | | | |
|---|---|---|---|---|
| 2016/0271434 | A1* | 9/2016 | Dusing | H04L 67/12 |
| 2017/0319882 | A1 | 11/2017 | Hart et al. | |

FOREIGN PATENT DOCUMENTS

| | | | | | |
|---|---|---|---|---|---|
| CN | 114935358 | A | * | 8/2022 | G06N 3/045 |
| KR | 10-2021-0018602 | A | | 2/2021 | |

* cited by examiner

APPARATUSES AND METHODS FOR MEASURING FIRE SPREAD RATE

CROSS-REFERENCE TO RELATED APPLICATIONS

This application claims priority pursuant to 35 U.S.C. 119(a) to Indian Application No. 202311002785, filed Jan. 13, 2023, which application is incorporated herein by reference in its entirety.

FIELD OF THE INVENTION

Exemplary embodiments of the present disclosure relate generally to methods and apparatuses for measuring a fire spread rate, and more particularly, to methods and apparatuses for triggering an extinguisher system according to the fire spread rate.

BACKGROUND

Fire sensors may be used to detect a fire and trigger an extinguishing system, and may be implemented in various applications. For example, a fire sensor may be a part of a system for detecting a fire and triggering an extinguishing system. However, such fire sensors are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for configuring an apparatus, for example a method for measuring a fire spread rate.

In accordance with various examples of the present disclosure, a method for measuring a fire spread rate by a controller component is provided. The method comprises: monitoring a field of view of a first sensor, where the first sensor is a long wavelength infrared (LWIR) camera configured to detect one or more fire by products; determining that a fire event occurs based on a detection of at least one particle in the field of view of the first sensor; determining a fire spread rate in an instance that the fire event occurs; and triggering an extinguisher system according to the fire spread rate and a distance between the first sensor and the extinguisher system.

In some embodiments, determining the fire spread rate comprises: determining a first time that the first sensor detects fire particles at a first location; determining a second time that the first sensor detects the fire particles at a second location; determining a distance between the first location and the second location; and calculating the fire spread rate according to the first time, the second time, and the distance between the first location and the second location.

In some embodiments, the LWIR camera includes a bandwidth filter configured to detect the one or more fire by products.

In some embodiments, the first location and the second location are located along an axis of a pipeline.

In some embodiments, the second location is further located in a line of sight of the first sensor; and the first location is angled θ with respect to the line of sight of the first sensor.

In some embodiments, the pipeline is a cylindrical tube.

In some embodiments, the method for measuring the fire spread rate by the controller component further comprises monitoring a field of view of a second sensor, wherein the second sensor is also a LWIR camera configured to detect the one or more fire by products.

In some embodiments, determining the fire spread rate comprises: determining a second time when the first sensor detects fire particles; determining a third time when a second sensor detects the fire particles; determining a distance between the first sensor and the second sensor; and calculating the fire spread according to the second time, the third time, and the distance between the first sensor and the second sensor.

In some embodiments, the method for measuring the fire spread rate by the controller component further comprises determining that the fire event spreads by comparing the fire spread rate with a predetermined threshold spread rate In some embodiments, determining whether a fire event occurs comprises: comparing a number of fire particle detected by the first sensor with a threshold.

In accordance with various examples of the present disclosure, an apparatus for measuring a fire spread rate is provided. The apparatus comprises: a fire spread rate measurement component, including a first sensor and an extinguisher system, wherein the first sensor is a long wavelength infrared (LWIR) camera configured to detect one or more fire by products; and a controller component electronically coupled to the fire spread rate measurement component, wherein the controller component is configured to: monitor a field of view of the first sensor; determine that a fire event occurs based on a detection of at least one particle in the field of view of the first sensor; determine a fire spread rate in an instance that the fire event occurs; and trigger the extinguisher system according to the fire spread rate and a distance between the first sensor and the extinguisher system.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
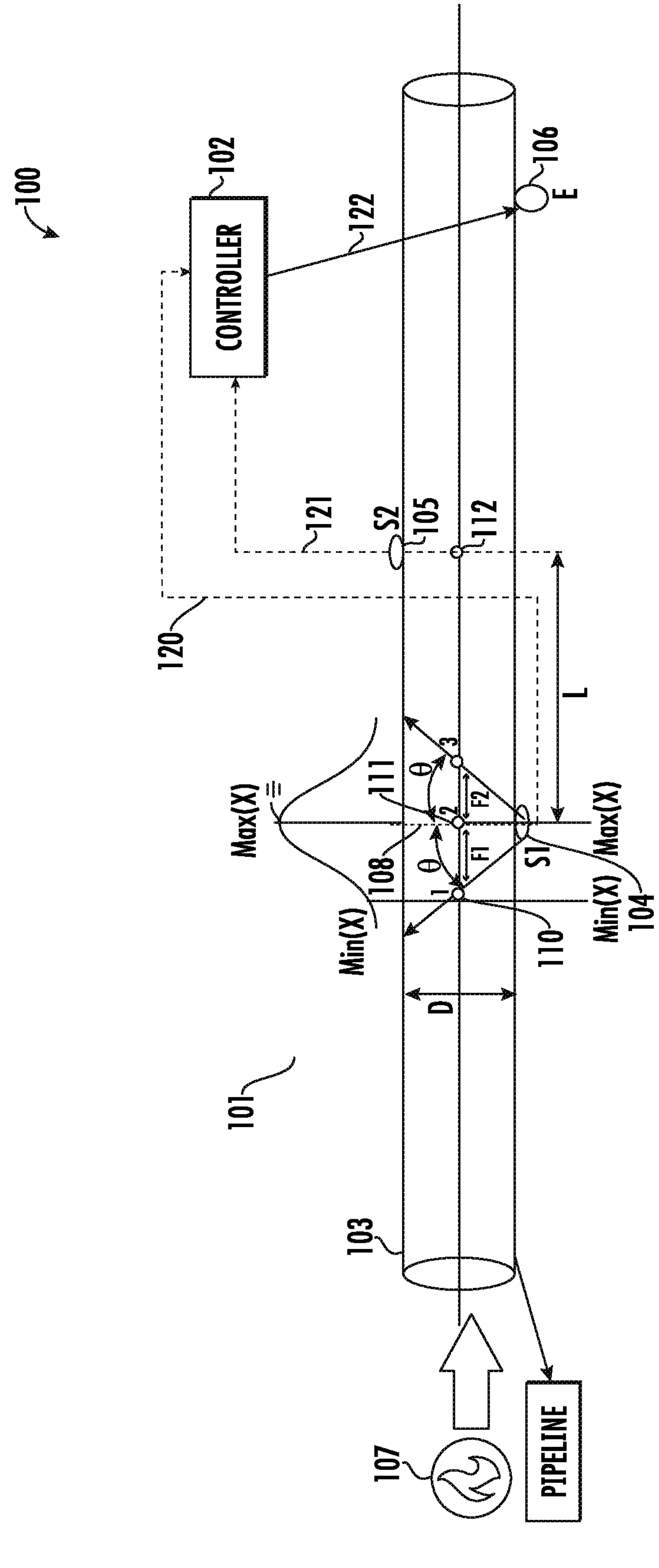
FIG. 1 illustrates a schematic diagram depicts an example fire spread rate measurement apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would." "preferably." "possibly." "typically." "optionally." "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, a controller, sensors, an example processing circuitry, communication module, input/output module, memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "electromagnetic radiation" or "radiation" may refer to various kinds of electromagnetic radiant energy that exhibits properties of waves and particles including visible light, radio waves, microwaves, infrared (IR), ultraviolet (UV), X-rays and gamma rays. Visible light may refer to electromagnetic radiation that can be detected by a human eye. The electromagnetic spectrum comprises a range of all known types of electromagnetic radiation, including electromagnetic radiation that cannot be detected by the human eye. Various portions of the electromagnetic spectrum are associated with electromagnetic radiation that has certain characteristics (e.g., certain wavelengths and frequencies). For example, visible light emits electromagnetic radiation with wavelengths ranging between 380 and 750 nanometers (nm). In contrast, IR electromagnetic radiation may comprise wavelengths ranging between 0.7 and 14 microns. For example, the sensors may detect fire particles through the electromagnetic radiation of the fire particles.

In various embodiments herein as used in present disclosure, the term "fire" may also refer to combustion, smoldering, burning, excessive heat, and/or flame associated with or related to a state, process, or instance of combustion in which fuel or other material is ignited and combined with oxygen, giving off light, heat, and/or flame.

In some examples, fire produces electromagnetic radiation with certain characteristics. For example, fire may emit electromagnetic radiation with particular visible and/or infrared light characteristics/properties (e.g., wavelengths, intensity, image shape, and/or the like). These characteristics and properties may depend on characteristics of a fire source (e.g., fuel type). The visible light radiation produced by a fire may be detected using visible wavelength camera(s), and/or the infrared radiation may be detected using infrared camera (s).

Various example embodiments of the present disclosure provide a method and an apparatus to determine a fire spread rate and generate alerts or alarms and/or activate an extinguisher system based on the fire spread rate. An example method for determining a fire spread rate may comprise determining the fire spread rate in an instance when a fire event is detected. In some embodiments, the example method for determining the fire spread rate may be implemented in environments where there is a high likelihood of a fire and/or where certain types of combustible materials are used or stored. For example, the example method for determining the fire spread rate may be implemented at power plants, chemical storage and production facilities, factories, etc. In some embodiments, the example method for determining the fire spread rate may be implemented in residential, commercial, recreational and/or other facilities. In various embodiments, the example method for determining the fire spread rate may be implemented in any environment where fire may cause harm to life, health, and/or property.

There are a plurality of byproducts of fire. One such byproduct of fire is carbon dioxide ($CO_2$). In some examples, a sensor to detect a fire event may be configured to detect infrared radiation peak that may be produced by the carbon dioxide byproduct of fire at wavelengths about 2 to 6 micron, more preferably 3.5 to 5 micron, and most preferably about 4.3 micron.

As presented in various embodiments of the present disclosure, water ($H_2O$) is also a byproduct of fire. In various embodiments herein, a sensor for detecting a fire event may be configured to detect, in some examples, an infrared radiation emitted by the water byproduct of a fire to detect the fire. The infrared radiation emitted by the water byproduct of fire, in some examples, has a unique pattern/signature in the wavelength range of about 1 microns to about 14 microns. In various embodiments herein, a sensor for detecting a fire event may use long wavelength infrared (LWIR) camera(s) with, in some examples, bandpass filters with passband between about 1 microns to about 14 microns.

In various embodiments, to determine the fire spread rate, a controller component may be in electrical communication with the sensor and configured to determine the fire spread rate according to a signal collected from the sensor. In various embodiments, the signal collected from the sensor may include a location of fire event and a time stamp of the fire event. In various embodiments, to determine the fire spread rate, a controller component may be in electrical communication with at least two sensors and configured to determine the fire spread rate according to signals collected from the at least two sensors. In various embodiments, the controller component may further be configured to determine a distance between fixed positions along a physical structure, such as a pipeline. For example, the controller component may be configured to determine a distance between a first position and a second location. For example, the first position and the second location are located on an axis of a pipeline. In various embodiments, the controller component may be further configured to determine a fire spread rate according to time stamps to detect fire particles of the fire event at various positions, such as the first position and the second position (e.g., fixed positions). For example, the controller component may be configured to determine a fire spread rate according to a first time to detect the fire particles of the fire event at the first position and a second time to detect the fire particles of the fire event at the second location. For example, the controller component may be configured to trigger or activate an extinguisher system according to the fire spread rate only when it is needed, such that a waste of the suppression material of the extinguisher system may be avoided and the effective usage of the extinguisher system may be improved.

Referring now to FIG. 1, an example schematic diagram depicts an example fire spread rate measurement apparatus 100 in accordance with various embodiments of the present disclosure. The fire spread rate measurement apparatus 100 may include a fire spread rate measurement component 101 and a controller component 102 in electronic communication with the fire spread rate measurement component 101.

In various embodiments, the fire spread rate measurement component 101 may include a physical component, such as a pipeline 103. In some examples, the pipeline 103 may be used to store, transfer, or move a fluid. For example, the fluid may be natural gas and/or the like. In some examples, the pipeline 103 may be made of steel tubes, plastic tubes, or the like. In some examples, the pipeline 103 may be used as passage to heat, ventilate, and air condition to deliver and remove air. For example, the pipeline 103 may be made of steel tubes, aluminum tube, plastic tubes, or the like.

In some examples, a first sensor 104 may be located or otherwise positioned along a wall of the pipeline 103. For example, in an instance in which a fire source 107 radiates fire particles and at least a portion of the fire particles move along the pipeline 103, the first sensor 104 may be configured to receive or detect the fire particles radiated from the fire source 107 when the fire particles reach a field of view of the first sensor 104. For example, the first sensor 107 may be a long wavelength infrared (LWIR) camera configured to detect one or more fire by products of the one or more fire.

In some examples, there are a plurality of byproducts of fire. One such byproduct of fire is carbon dioxide ($CO_2$). In some examples, the first sensor 104 may be configured to detect infrared radiation peak that may be produced by the carbon dioxide byproduct of fire at wavelengths about 2 to 6 micron, more preferably 3.5 to 5 micron, and most preferably about 4.3 micron.

Alternatively or additionally, water ($H_2O$) is also a byproduct of fire. In various embodiments herein, the first sensor 104 may be configured to detect, in some examples, an infrared radiation emitted by the water byproduct of a fire to detect the fire. The infrared radiation emitted by the water byproduct of fire, in some examples, has a unique pattern/signature in the wavelength range of about 7 microns to about 8 microns. In various embodiments herein, a sensor for detecting a fire event may use long wavelength infrared (LWIR) camera(s) with, in some examples, bandpass filters with passband between about 7 microns to about 14 microns.

In various embodiments, in response to receiving or detecting the fire particles, the first sensor 104 may generate a first signal 120. In some embodiments, the first signal 120 may include a plurality of time stamps indicating a time in which fire particles reach a particular location within the pipeline 103. For example, the first signal 120 may include a first time indicating a time in which the fire particles reach a first location 110. As shown in FIG. 1, the first location 110 may be angled θ with respect to a line of sight 108 of the first sensor 104. For example, the first signal may further include a second time indicating a time in which the fire particles reach a second location 111. As shown in FIG. 1, the second location 111 may be in the line of sight 108 of the first sensor 104.

In some embodiments, as shown in FIG. 1, the first sensor 104 may have an angle of view 20. In response to a fire event, the first sensor 104 may detect a maximum number of fire particles at the second location 111 when the second location 111 is in the line of sight 108 of the first sensor 104. The first sensor 104 may detect a minimum number of fire particles at the first location 110 when the first location 110 is angled θ with respect to a line of sight 108 of the first sensor 104. For example, the first location 110 may be angled 45° with respect to the line of sight 108 of the first sensor 104.

In some embodiments, the pipeline 103 may take a form of a cylindrical tube. For example, the cylindrical tube used to transport natural gas may have an inner diameter D in a range from 10 mm to 2000 mm, preferable in a range from 100 mm to 1220 mm. For example, the cylindrical tube used as air passages may have an inner diameter D in a range from 50 mm to 1000 mm, preferable in a range from 100 mm to 500 mm.

In various embodiments, the controller component 102 may determine a distance $F_1$ between the first location and the second location according to following equation (Eq. 1):

$$F1 = \mathrm{Tan}\theta * 0.5D \qquad \text{Eq. 1}$$

In various embodiments, the controller component 102 may further determine a fire spread rate according to following equation (Eq. 2):

$$\text{the fire spread rate} = \frac{\text{the distance between the first and second location}}{\text{the second time} - \text{the first time}} \qquad \text{Eq. 2}$$

In various embodiments, the fire spread rate measurement component 101 may further include a second sensor 105 located along the wall of the pipeline 103. For example, the second sensor 105 may be configured to receive or detect the fire particles radiated from the fire source 107 when the fire particles reach a third location 112.

In various embodiments, in response to receiving or detecting the fire particles when the fire particles reach the third location 112, the second sensor 105 may generate a second signal 121. In some embodiments, the second signal 121 may include a time stamp that provides an indication of when the fire particles reach or are otherwise detected within the field of view of the second sensor 105. For example, the second signal 121 may include a third time indicating a time in which the fire particles reach a third location 112. For example, as shown in FIG. 1, a distance between the second location 111 and the third location 112 is L and the third location 112 may be in a line of sight of the second sensor 105.

In various embodiments, the controller component 102 may determine a fire spread rate according to following equation (Eq. 3):

$$\text{the fire spread rate} = \frac{\text{the distance between the first sensor and the second sensor}}{\text{the third time} - \text{the second time}} \quad \text{Eq. 3}$$

In various embodiments, the controller component 102 may set or be otherwise be provided with a threshold number of fire particles for the first sensor 104 and the second sensor 105 according to the minimum number of fire particles at the first location 110 when the first location 110 is angled θ with respect to a line of sight 108 of the first sensor 104. For example, the threshold number of fire particles may be set to be equal to the minimum number of fire particles at the first location 110. In some embodiments, the controller component 102 may determine a fire event is detected when the first sensor 104 or the second sensor 105 detects more fire particles than the threshold number of fire particles. Alternatively, the controller component 102 may set or be otherwise be provided with a threshold number of fire particles for the first sensor 104 and the second sensor 105 according to the number of fire particles at the second location 111, which is in a line of sight 108 of the first sensor 104.

In various embodiments, the threshold number of fire particles may vary according to different industry standard. For example, a weighted moving average of the number of fire particles may be used as the threshold number of fire particles. In some examples, the controller component 102 may sample the first sensor 104 or the second sensor 105 once every 16 ms and determine a fire event occurs when the detected number of fire particles is greater than the threshold number of fire particles for a continuous ten 160 ms.

In various embodiments, the fire spread rate measurement component 101 may further include an extinguisher system 106 located further along the wall of the pipeline 103. In some embodiments, the controller component 102 may generate a third signal 122 according to the fire spread rate of the fire and send the third signal to the extinguisher system 106.

In some embodiments, the extinguisher system 106 may receive the third signal 122 from the controller component 102. For example, the third signal 122 may include an activation signal to activate the extinguisher system 106 to extinguish the fire particles. For example, the third signal 122 may include the fire spread rate. In some embodiments, the fire spread rate may be provided to fire officers through the extinguisher system 106. For example, the extinguisher system 106 may include a plurality of fire extinguishers that can be triggered or activated to flood a space with an agent, such that the fire may be suppressed by the agent. In other examples, the extinguishing system may produce a guess that removes oxygen from the area so as to extinguish the fire.

In various embodiments, the controller component 102 may determine when to activate the extinguisher system 106 according to a distance between the extinguisher system 106 and the first sensor 104. In some embodiment, a delay period after detecting or receiving the fire particles by the first sensor may be determined according to following equation (Eq. 4):

$$\text{the delay period} = \frac{\text{the distance between the extinguisher system and the first sensor}}{\text{the spread rate}} \quad \text{Eq. 4}$$

While FIG. 1 provides an example fire spread rate measurement apparatus 100 that includes a first sensor 104 and a second sensor 105, it is noted that the scope of the present disclosure is not limited to the example shown in FIG. 1. In some examples, the example fire spread rate measurement apparatus 100 may include only the first sensor 104. In some examples, the example fire spread rate measurement apparatus 100 may include one or more sensor(s) in addition to the first sensor 104 and the second sensor 105. In some examples, the example fire spread rate measurement apparatus 100 may include one or more additional and/or alternative elements, and/or may be structured/positioned differently than that illustrated in FIG. 1. For example, the fire spread rate measurement apparatus 100 may include more than two sensor(s) that may receive and/or detect the fire particles emitted by the fire source 107. The one or more sensor(s) may be couples to the controller component 102 to determine the fire spread rate.

Figure 2:
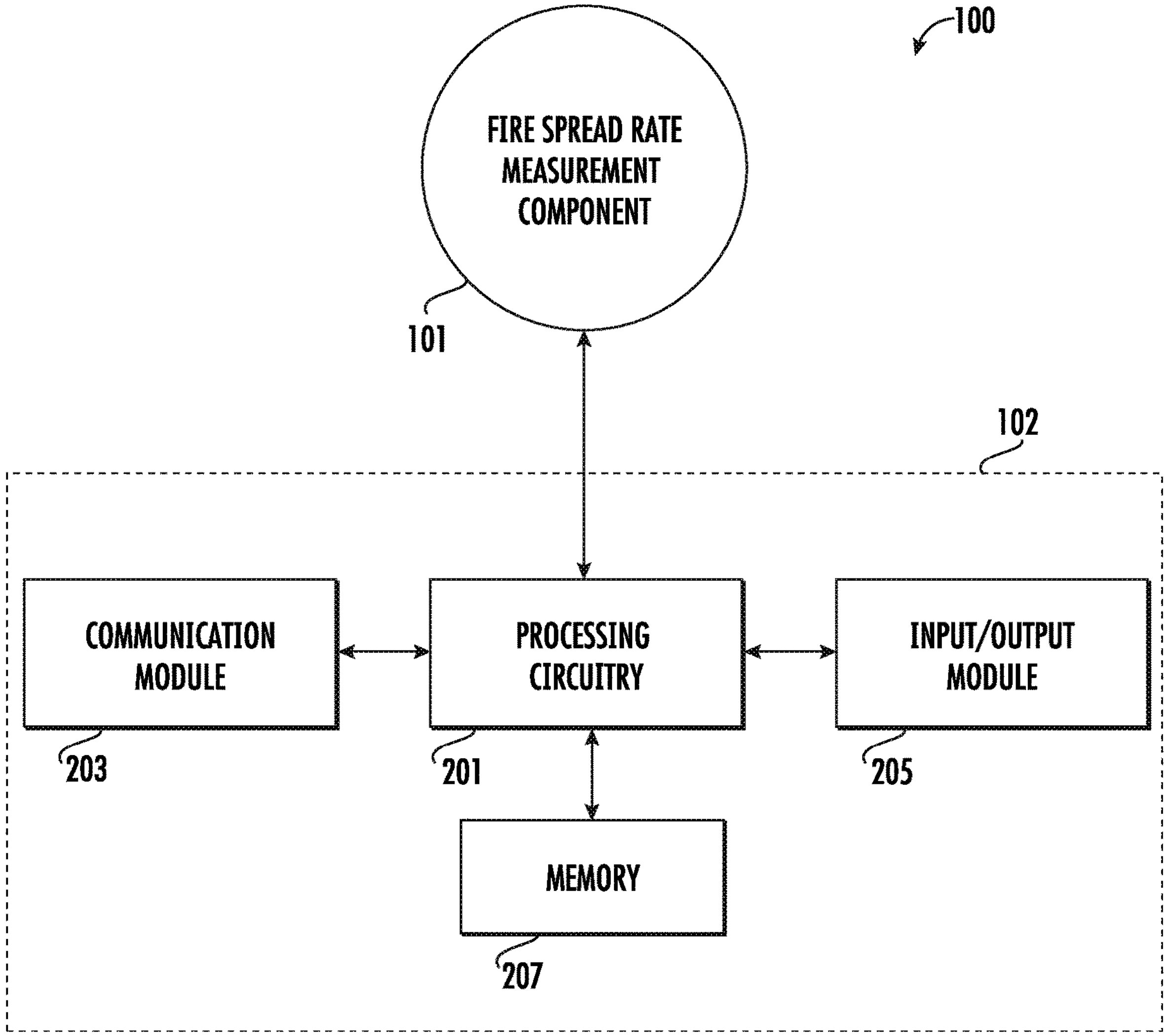
FIG. 2 is a block diagram depicting an example fire spread rate measurement apparatus in accordance with various embodiments of the present disclosure.

Referring now to FIG. 2, a block diagram depicting an example fire spread rate measurement apparatus 100 in accordance with various embodiments of the present disclosure is provided. As shown, the fire spread rate measurement apparatus 100 includes a fire spread rate measurement component 101 and a controller component 102 in electronic communication with the fire spread rate measurement component 101. The controller component 102 includes processing circuitry 201, a communication module 203, input/output module 205, a memory 207 and/or other components configured to perform various operations, procedures, functions or the like described herein.

As shown, the controller component 102 (such as the processing circuitry 201, communication module 203, input/output module 205 and memory 207) is electrically coupled to and/or in electronic communication with a fire spread rate measurement component 101. As depicted, the fire spread rate measurement component 101 may exchange (e.g., transmit and receive) data with the processing circuitry 201 of the controller component 102.

The processing circuitry 201 may be implemented as, for example, various devices including one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 201 may include one or more processors. In one exemplary embodiment, the processing circuitry 201 is configured to execute instructions stored in the memory 207 or otherwise accessible by the processing circuitry 201. When executed by the processing circuitry 201, these instructions may enable the controller component 102 to execute one or a plurality of the functions as described herein. No matter whether it is configured by hardware, firmware/software methods, or a combination thereof, the processing circuitry 201 may include entities capable of executing operations according to the embodiments of the present invention when correspondingly configured. Therefore, for example, when the processing circuitry 201 is implemented as an ASIC, an FPGA, or the like, the processing circuitry 201 may include specially configured hardware for implementing one or a plurality of operations described herein. Alternatively, as another example, when the processing circuitry 201 is implemented as an actuator of instructions (such as those that may be stored in the memory 207), the instructions may specifically configure the processing circuitry 201 to execute one or a plurality of algorithms and operations described herein, such as those discussed with reference to FIG. 3.

The memory 207 may include, for example, a volatile memory, a non-volatile memory, or a certain combination thereof. Although illustrated as a single memory in FIG. 2, the memory 207 may include a plurality of memory components. In various embodiments, the memory 207 may include, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 207 may be configured to store information, data, application programs, instructions, and etc., so that the controller component 102 can execute various functions according to the embodiments of the present disclosure. For example, in at least some embodiments, the memory 207 is configured to cache input data for processing by the processing circuitry 201. Additionally or alternatively, in at least some embodiments, the memory 207 is configured to store program instructions for execution by the processing circuitry 201. The memory 207 may store information in the form of static and/or dynamic information. When the functions are executed, the stored information may be stored and/or used by the controller component 102.

The communication module 203 may be implemented as any apparatus included in a circuit, hardware, a computer program product or a combination thereof, which is configured to receive and/or transmit data from/to another component or apparatus. The computer program product includes computer-readable program instructions stored on a computer-readable medium (for example, the memory 207) and executed by a controller component 102 (for example, the processing circuitry 201). In some embodiments, the communication module 203 (as with other components discussed herein) may be at least partially implemented as the processing circuitry 201 or otherwise controlled by the processing circuitry 201. In this regard, the communication module 203 may communicate with the processing circuitry 201, for example, through a bus. The communication module 203 may include, for example, antennas, transmitters, receivers, transceivers, network interface cards and/or supporting hardware and/or firmware/software, and is used for establishing communication with another apparatus. The communication module 203 may be configured to receive and/or transmit any data that may be stored by the memory 207 by using any protocol that can be used for communication between apparatuses. The communication module 203 may additionally or alternatively communicate with the memory 207, the input/output module 205 and/or any other component of the controller component 102, for example, through a bus.

In some embodiments, the controller component 102 may include an input/output module 205. The input/output module 205 may communicate with the processing circuitry 201 to receive instructions input by the user and/or to provide audible, visual, mechanical or other outputs to the user. Therefore, the input/output module 205 may be in electronic communication with supporting devices, such as a keyboard, a mouse, a display, a touch screen display, and/or other input/output mechanisms. Alternatively, at least some aspects of the input/output module 205 may be implemented on a device used by the user to communicate with the controller component 102. The input/output module 205 may communicate with the memory 207, the communication module 203 and/or any other component, for example, through a bus. One or a plurality of input/output modules and/or other components may be included in the controller component 102.

Figure 3:
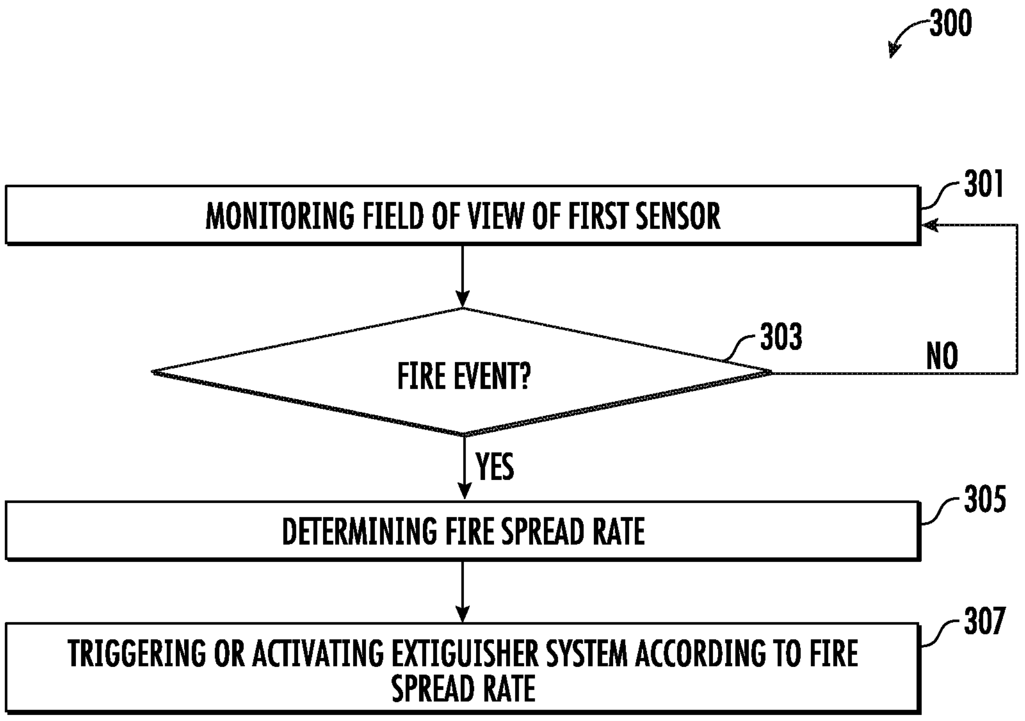
FIG. 3 is a flowchart diagram illustrating example operations in accordance with various embodiments of the present disclosure.

Referring now to FIG. 3, a flowchart diagram illustrating an example method 300, in accordance with various embodiments of the present disclosure is provided.

As depicted in FIG. 3, in some examples, the method 300 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a fire spread rate measurement component, an indication element, a memory (such as, for example, random access memory (RAM) for storing computer program instructions), and/or a display circuitry (for rendering information on a display).

In some examples, one or more of the procedures described in FIG. 3 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may include one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

At step/operation 301 of the example method 300, a processing circuitry (such as, but not limited to, the processing circuitry 201 of the controller component 102 illustrated in connection with FIG. 2, discussed above) instructs a fire spread rate measurement component 101 to monitor a field of view of a first sensor. For example, as shown in FIG. 1, the first sensor 104 of the fire spread rate measurement component 101 may monitor and detect when fire particles enter the field of view of the first sensor 104. For example, the first sensor 104 may detect fire particles and the processing circuitry 201 of the controller component 102 may count how many fire particles enter the field of view of the first sensor 104 according to the first signal 120 generated by the first sensor 104.

In some embodiments, the first sensor 107 may be a long wavelength infrared (LWIR) camera configured to detect one or more fire by products of the one or more fire. For example, the first sensor 107 may have a bandpass filter to pass radiation with a wavelength in a range of about 2 to 6 micron, such that the first sensor 107 may detect one byproduct of fire, such as carbon dioxide ($CO_2$). For example, the first sensor 107 may have a bandpass filter to pass radiation with a wavelength in a range of about 7 to 14 micron, such that the first sensor 107 may detect one byproduct of fire, such as water ($H_2O$).

At step/operation 303 of the example method 300, the processing circuitry (such as, but not limited to, the processing circuitry 201 of the controller component 102 illustrated in connection with FIG. 2, discussed above) determines whether a fire event occurs according to the detection of the first sensor 104. For example, the processing circuitry 201 of the controller component 102 may determine whether a fire event occurs by comparing the number of detected fire particles with a threshold value.

For example, if the number of detected fire particles is greater than the threshold value, the fire event occurs. If the processing circuitry 201 of the controller component 102 determines that a fire event occurs, the example method may proceed to step/operation 305. For example, if the number of detected fire particles is smaller than the threshold value, the fire event does not occur. If the processing circuitry 201 of the controller component 102 determines that no fire event occurs, the example method may proceed to step/operation 301.

At step/operation 305 of the example method 300, the processing circuitry (such as, but not limited to, the processing circuitry 201 of the controller component 102 illustrated in connection with FIG. 2, discussed above) determines a fire spread rate. Example methods for determining a fire spread rate are disclosed and discussed with respect to FIGS. 4 and 5.

Figure 4:
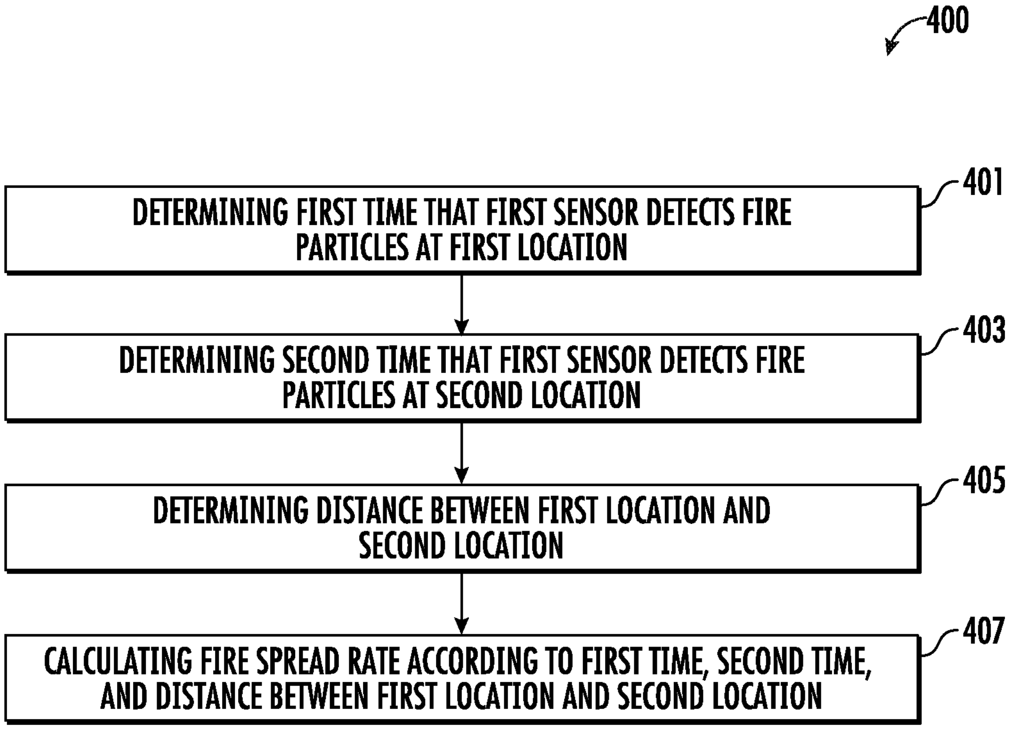
FIG. 4 is a flowchart diagram illustrating example operations in accordance with various embodiments of the present disclosure.

Referring now to FIG. 4, a flowchart diagram illustrating an example method 400 to determine the fire spread rate, in accordance with various embodiments of the present disclosure is provided. As depicted in FIG. 4, steps/operations of determining the fire spread rate are performed by the processing circuitry (such as, but not limited to, the processing circuitry 201 of the controller component 102.

At step/operation 401 of the example method 400, a processing circuitry (such as, but not limited to, the processing circuitry 201 of the controller component 102 illustrated in connection with FIG. 2, discussed above) determines a first indicating a time in which when the first sensor detects fire particles at a first location. For example, as shown in FIG. 1, the first location 110 may be angled θ with respect to a line of sight 108 of the first sensor 104.

At step/operation 403 of the example method 400, a processing circuitry (such as, but not limited to, the processing circuitry 201 of the controller component 102 illustrated in connection with FIG. 2, discussed above) determines a second time indicating a time in which the first sensor detects the fire particles at a second location. For example, as shown in FIG. 1, the second location 111 may be in the line of sight 108 of the first sensor 104.

At step/operation 405 of the example method 400, a processing circuitry (such as, but not limited to, the processing circuitry 201 of the controller component 102 illustrated in connection with FIG. 2, discussed above) determines a distance between the first location and the second location. For example, as shown in FIG. 1, the processing circuitry 201 of the controller component 102 may determine a distance $F_1$ between the first location and the second location according to Eq. 1.

At step/operation 405 of the example method 400, a processing circuitry (such as, but not limited to, the processing circuitry 201 of the controller component 102 illustrated in connection with FIG. 2, discussed above) calculate the fire spread rate according to the first time, the second time, and the distance between the first location and the second location. For example, the processing circuitry 201 of the controller component 102 may further determine a fire spread rate according to Eq. 2.

Alternatively or additionally, referring back to FIG. 1, the fire spread rate measurement component 101 may further include a second sensor 105 located along the wall of the pipeline 103. and in order to determine the fire spread rate, the processing circuitry 201 of the controller component 102 may receive a second signal 121 from the second sensor 105. For example, the second sensor 105 may be configured to receive or detect the fire particles radiated from the fire source 107 when the fire particles reach a field of view of the second sensor 105. In some embodiments, the second signal 121 may include a time stamp when the fire particles reach the field of view of the second sensor 105. For example, the second signal 121 may include a third time indicating a time in which the fire particles reach a third location 112. For example, as shown in FIG. 1. a distance between the second location 111 and the third location 112 is L and the third location 112 may be in the line of sight of the second sensor 105.

Figure 5:
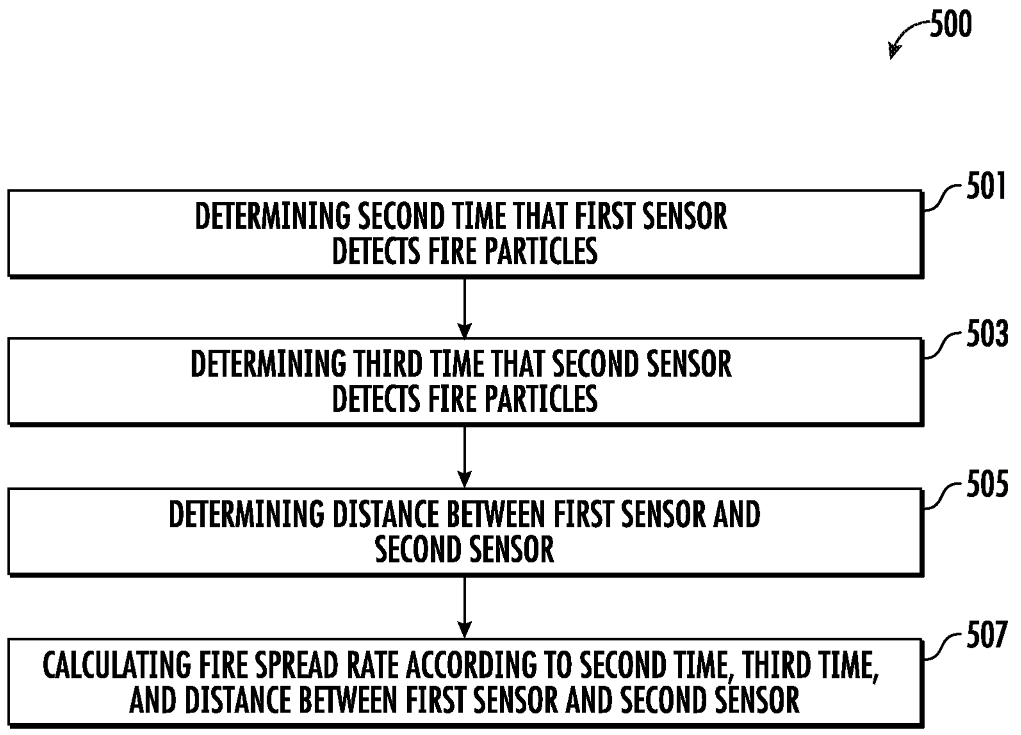
FIG. 5 is a flowchart diagram illustrating example operations in accordance with various embodiments of the present disclosure.

Referring now to FIG. 5, a flowchart diagram illustrating an example method 500 to determine the fire spread rate, in accordance with various embodiments of the present disclosure is provided.

As depicted in FIG. 5, steps of determining the fire spread rate are performed by the processing circuitry (such as, but not limited to, the processing circuitry 201 of the controller component 102.

At step/operation 501 of the example method 500, a processing circuitry (such as, but not limited to, the processing circuitry 201 of the controller component 102 illustrated in connection with FIG. 2, discussed above) determines a second time indicating a time in which the first sensor detects fire particles at the second location 111. For example, as shown in FIG. 1, the second location 111 may be in the line of sight 108 of the first sensor 104.

At step/operation 503 of the example method 500, a processing circuitry (such as, but not limited to, the processing circuitry 201 of the controller component 102 illustrated in connection with FIG. 2, discussed above) determines a third time indicating a time in which a second sensor detects the fire particles at a third location 112. For example, as shown in FIG. 1, the third location 112 may be in the line of sight of the second sensor 105.

At step/operation 505 of the example method 500, a processing circuitry (such as, but not limited to, the processing circuitry 201 of the controller component 102 illustrated in connection with FIG. 2, discussed above) determines determining a distance between the first sensor and the second sensor. For example, as shown in FIG. 1, the processing circuitry 201 of the controller component 102 may determine that a distance between the first location and the second location equals L.

At step/operation 505 of the example method 500, a processing circuitry (such as, but not limited to, the processing circuitry 201 of the controller component 102 illustrated in connection with FIG. 2, discussed above) calculate the fire spread rate according to the second time, the third time, and the distance between the first sensor and the second sensor. For example, the processing circuitry 201 of the controller component 102 may further determine a fire spread rate according to Eq. 3.

Referring back to FIG. 3, at step/operation 307 of the example method 300, the processing circuitry (such as, but not limited to, the processing circuitry 201 of the controller component 102 illustrated in connection with FIG. 2, discussed above) triggers or activates an extinguisher system 106 according to the fire spread rate.

In various embodiments, the extinguisher system 106 may be located further along the wall of the pipeline 103. In some embodiments, the processing circuitry 201 of the controller component 102 may generate a third signal 122 according to the fire spread rate and send the third signal to the extinguisher system 106.

In some embodiments, the processing circuitry 201 of the controller component 102 may compare the fire spread rate to a predetermined fire spread rate. In an instance that the fire spread rate is greater than or equal to the predetermined fire spread rate, the processing circuitry 201 of the controller component 102 may determine that the fire event is spreading, and may further generate the third signal 122 according to the fire spread rate and send the third signal to the extinguisher system 106. In an instance that the fire spread rate is smaller than the predetermined fire spread rate, the processing circuitry 201 of the controller component 102 may determine that the fire event is not spreading, In some embodiments, the extinguisher system 106 may receive the third signal 122 from the controller component 102. For example, the third signal 122 may include an activation signal to activate the extinguisher system 106 to extinguish the fire particles. For example, the third signal 122 may include the fire spread rate and the fire spread rate may be provided to fire officers through the extinguisher system 106, such that the fire officers may plan the activation of the extinguisher system 106 or plan the evacuation.

In various embodiments, the controller component 102 may determine when to activate the extinguisher system 106 according to a distance between the extinguisher system 106 and the first sensor 104. In some embodiment, a delay period after detecting or receiving the fire particles by the first sensor may be determined according to equation Eq. 4.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for measuring a fire spread rate by a controller component, comprising:

monitoring a field of view of a first sensor, wherein the first sensor is a long wavelength infrared (LWIR) camera configured to detect one or more fire byproducts;

determining that a fire event occurs based on a detection of at least one particle in the field of view of the first sensor;

determining the fire spread rate in response to determining that the fire event occurs, comprising:

determining a first time that the first sensor detects fire particles at a first location;

determining a second time that the first sensor detects the fire particles at a second location;

determining a distance between the first location and the second location; and calculating the fire spread rate according to the first time, the second time, and the distance between the first location and the second location; and triggering an extinguisher system according to the fire spread rate and the distance between the first sensor and the extinguisher system.

2. The method of claim 1, wherein:

the LWIR camera includes a bandwidth filter configured to detect the one or more fire byproducts.

3. The method of claim 1, wherein:

the first location and the second location are located along an axis of a pipeline.

4. The method of claim 3, wherein:

the second location is further located in a line of sight of the first sensor; and the first location is angled 0 with respect to the line of sight of the first sensor.

5. The method of claim 4, wherein:

the pipeline is a cylindrical tube.

6. The method of claim 1, further comprising:

monitoring a field of view of a second sensor, wherein the second sensor is also a LWIR camera configured to detect the one or more fire byproducts.

7. The method of claim 6, wherein determining the fire spread rate comprises:

determining a third time that the second sensor detects the fire particles;

determining a distance between the first sensor and the second sensor; and calculating the fire spread rate according to the second time, the third time, and the distance between the first sensor and the second sensor.

8. The method of claim 1, further comprising:

determining that the fire event spreads by comparing the fire spread rate with a predetermined threshold spread rate.

9. The method of claim 1, wherein determining whether the fire event occurs comprises:

comparing a number of fire particles detected by the first sensor with a threshold.

10. An apparatus for measuring a fire spread rate, comprising:

a fire spread rate measurement component, including a first sensor and an extinguisher system, wherein the first sensor is a long wavelength infrared (LWIR) camera configured to detect one or more fire byproducts; and a controller component electronically coupled to the fire spread rate measurement component, wherein the controller component is configured to:

monitor a field of view of the first sensor;

determine that a fire event occurs based on a detection of at least one particle in the field of view of the first sensor;

determine the fire spread rate in response to determining that the fire event occurs comprising:

determining a first time that the first sensor detects fire particles at a first location;

determining a second time that the first sensor detects the fire particles at a second location;

determining a distance between the first location and the second location;

calculating the fire spread rate according to the first time, the second time, and the distance between the first location and the second location; and trigger the extinguisher system according to the fire spread rate and the distance between the first sensor and the extinguisher system.

11. The apparatus of claim 10, wherein:

the LWIR camera includes a bandwidth filter configured to detect the one or more fire byproducts.

12. The apparatus of claim 10, wherein:

the first location and the second location are located along an axis of a pipeline.

13. The apparatus of claim 12, wherein:

the second location is further located in a line of sight of the first sensor; and the first location is angled 0 with respect to the line of sight of the first sensor.

14. The apparatus of claim 13, wherein:

the pipeline is a cylindrical tube.

15. The apparatus of claim 14, wherein the fire spread rate measurement component further comprise:

a second sensor to monitor a field of view of the second sensor, wherein the second sensor is also a LWIR camera configured to detect the one or more fire byproducts.

16. The apparatus of claim 15, wherein to determine the fire spread rate, the controller component is configured to:

determine a third time that the second sensor detects the fire particles;

determine a distance between the first sensor and the second sensor; and calculate the fire spread rate according to the second time, the third time, and the distance between the first sensor and the second sensor.

17. The apparatus of claim 16, wherein the controller component is further configured to:

determine that the fire event spreads by comparing the fire spread rate with a predetermined threshold spread rate.

18. The apparatus of claim 10, wherein to determine whether the fire event occurs, the controller component is configured to:

compare a number of fire particles detected by the first sensor with a threshold.

* * * * *